United States Patent [19]

Ceresko

[11] Patent Number: 4,571,791

[45] Date of Patent: Feb. 25, 1986

[54] TUFTED UPHOLSTERY FOR CASKET PANELS AND A METHOD OF MAKING THE SAME

[75] Inventor: Joseph P. Ceresko, Lake Ariel, Pa.

[73] Assignee: Space Age Plastic Inc., Lake Ariel, Pa.

[21] Appl. No.: 463,738

[22] Filed: Feb. 4, 1983

[51] Int. Cl.[4] ............................................. A61G 17/00
[52] U.S. Cl. ....................................... 27/19; 29/91.1; 29/91.2; 29/450; 29/235
[58] Field of Search .................................... 5/408–410; 297/455, DIG. 1; 27/19; 29/91, 91.1, 91.2, 91.5, 91.7, 450, 235; 24/152, 150; 428/179, 123

[56] References Cited

U.S. PATENT DOCUMENTS

| | | | |
|---|---|---|---|
| 616,097 | 12/1898 | Freschl | 29/91.7 |
| 2,458,588 | 1/1949 | Gordon et al. | 29/91 X |
| 2,745,212 | 5/1956 | Guzzino | 5/408 X |
| 2,861,682 | 11/1958 | Hatcher | 297/DIG. 1 |
| 3,083,496 | 4/1963 | Feinerman | 297/455 |
| 3,162,923 | 12/1964 | Kaeser | 27/19 |
| 3,256,597 | 6/1966 | Brudney | 29/450 |
| 3,407,459 | 10/1968 | Elder | 27/19 |
| 3,831,230 | 8/1974 | Rawlings | 27/19 |
| 4,137,613 | 2/1979 | Ceresko | 27/19 |

FOREIGN PATENT DOCUMENTS 67516 10/1957 France ...................................... 27/19

Primary Examiner—Robert A. Hafer
Assistant Examiner—Daniel Nolan
Attorney, Agent, or Firm—Kane, Dalsimer, Kane, Sullivan and Kurucz

[57] ABSTRACT

A tufted upholstery is provided by shaping a thin rigid sheet into a decorative pattern and then affixing a fabric to the sheet so that the fabric takes the general shape the pattern. The attachment for holding the fabric adjacent to the sheet includes cuts that are an integral part of the sheet.

The upholstery is made by first forming the sheet, then placing the fabric over the sheet and attaching the sheet to the fabric by inserting portions of the fabric into the cuts.

5 Claims, 7 Drawing Figures

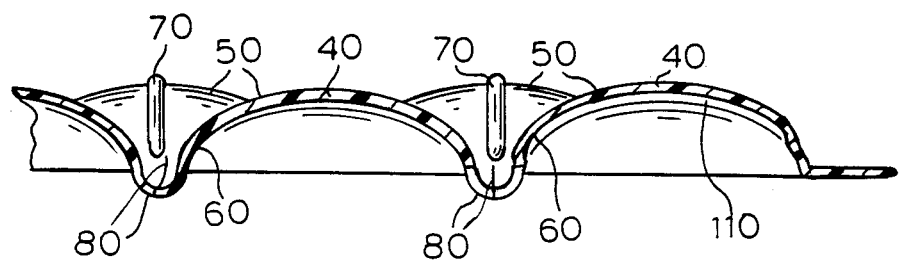
FIG.3
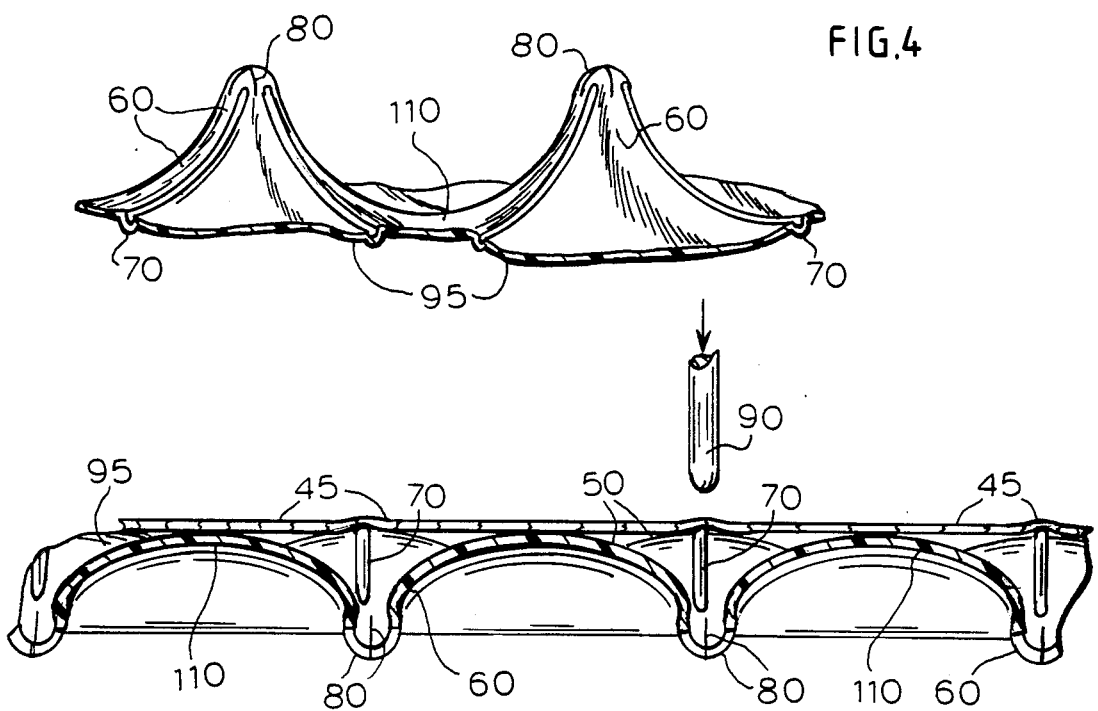
FIG.4
FIG.5

TUFTED UPHOLSTERY FOR CASKET PANELS AND A METHOD OF MAKING THE SAME

BACKGROUND OF THE INVENTION

This invention relates to upholstery and particularly to a method of upholstering casket panels.

The invention described herein is applied to a casket panel of the removable or non-removable type but it may be adapted for other similar articles.

It is customary to finish the inside of a casket with a ruffled or tufted fabric to give it a pleasing, rich look. The fabric may be glued, sewn, or tacked to the casket. If the material is tufted, then a high loft material such as batting is placed between the inner fabric and the panel and then the material is loosely affixed to the casket by staples or buttons. The batting forces the fabric to bulge away from the casket panel between the staples or buttons, to form concave surfaces and gives the upholstery so formed the special tufted look. However, until now this operation was carried out by hand and thus it was very time consuming. It took typically 45 minutes to one hour to finish a full panel.

OBJECTIVES AND SUMMARY OF THE INVENTION

The present invention has for its objective an upholstery for a casket panel with a tufted appearance.

A further objective is to provide a method of making said upholstery which can be automated.

Yet another objective is to provide tufted upholstery and method of making the same which is less expensive. Other objectives and advantages of the invention shall become apparent in the preferred description presented herein.

A tufted upholstery according to this invention comprises a thin rigid sheet which is formed in the desired decorative shape of the upholstery and a fabric disposed over the sheet. The fabric is attached to the sheet by attaching means which are an integral part of said sheet and are adapted to force the fabric to form the decorative shape of the sheet.

The tufted upholstery is made by forming said sheet of fabric into the desired shape, affixing the fabric to said sheet in manner that the fabric follows said shape, and disposing the sheet onto the panel with the side with the material providing an inner surface for the casket.

BRIEF DESCRIPTION OF THE DRAWINGS

FIG. 3 shows a cross-sectional view of the plastic sheet;

FIG. 4 shows a profile of the sheet with details of its rear surface;

FIGS. 5 and 6 show the intermediate steps performed in forming the upholstered interior, and;

DESCRIPTION OF THE PREFFERED EMBODIMENT

Figure 1:
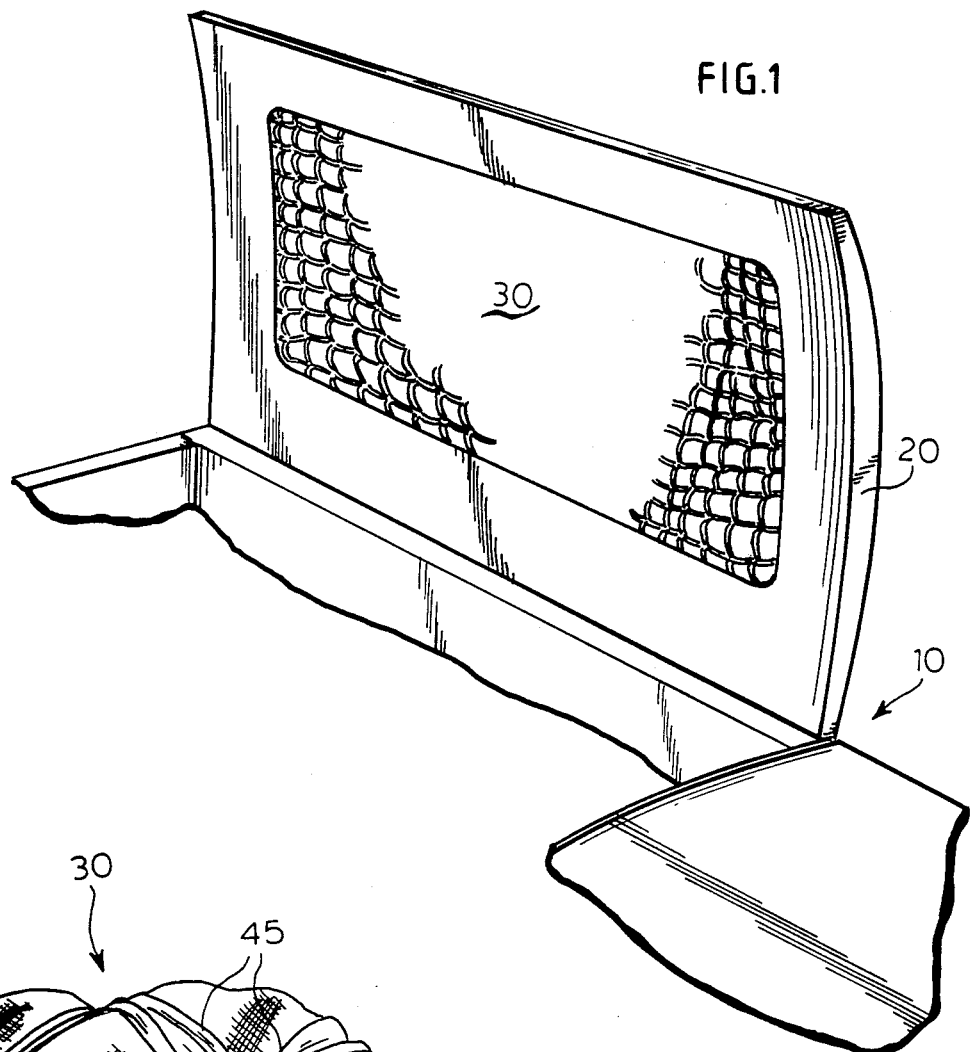
FIG. 1 shows a casket panel having a tufted interior upholstery.

The upholstery made according to this invention is shown in FIG. 1 where the numeral 10 designates the casket, 20 is a casket panel and 30 is the upholstered interior with a tufted look.

Figure 2:
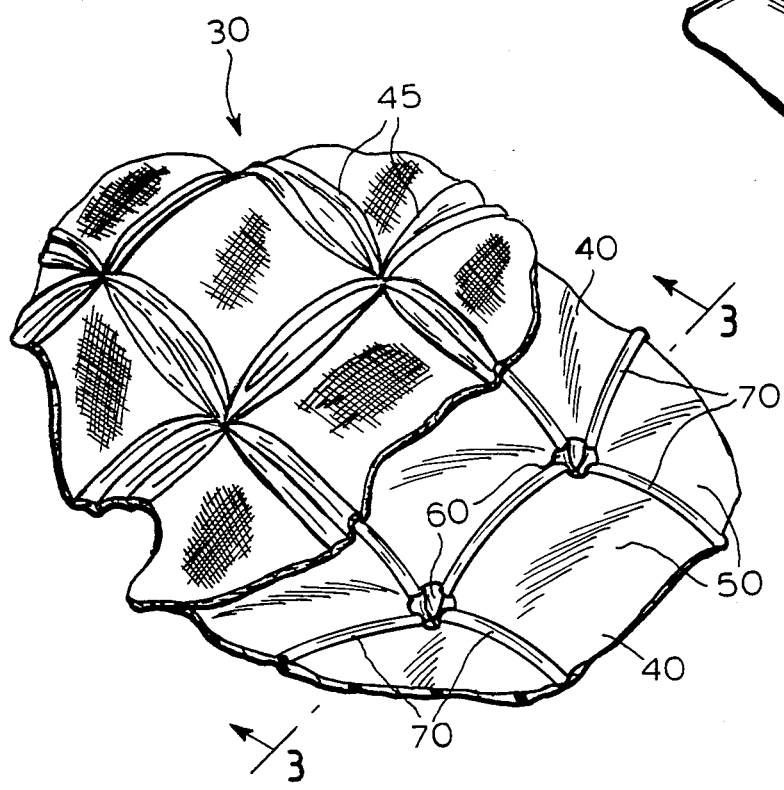
FIG. 2 shows the details of the interior made in accordance with the invention.

The upholstery 30, as shown in FIGS. 2 and 3, comprises a thin sheet 40 which holds fabric 45. Preferably the fabric should be a knit fabric or other similar flexible, and stretchable fabric which will readily assume the shape of the thin sheet 40. The sheet has a plurality of concave portions 50 separated by depressions or wells 60. The wells are joined by ridges 70. The spatial relationship of the wells, ridges, and concave portions determine the particular pattern of the upholstery. Thus FIGS. 1 and 2 show a square or diamond pattern. Similarly said sheet may be shaped to produce triangular, hexagonal, honeycomb, or any other geometric or even random pattern. As can be best seen in FIG. 4, the end or bottom of the depressions 60 has a number of cuts 80 which enable the sheet to hold the fabric. Preferably each depression has two cuts crossing each other to form an X.

The thin sheet may be made out of any rigid material. Preferably the material should be easy to shape. For example the sheet may be made out of a rigid plastic material which may be shaped by one of the molding techniques such as vacuum molding.

Figure 6:
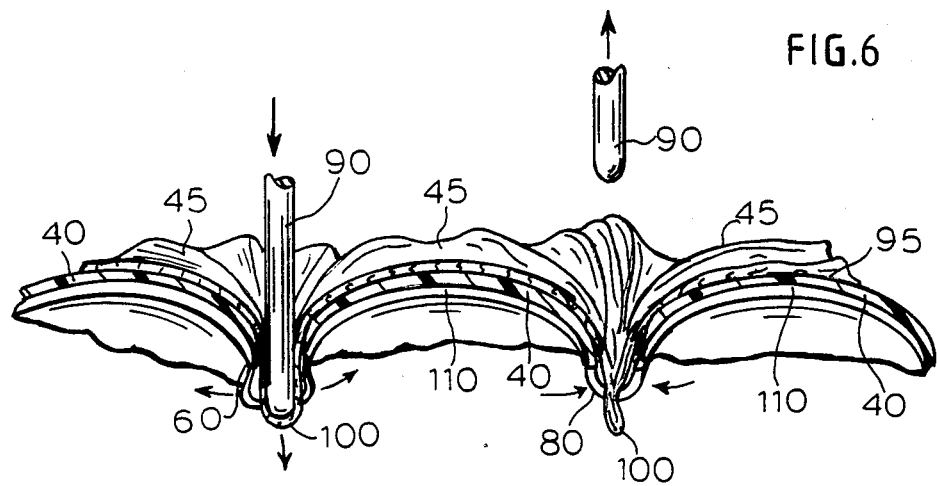
Figure 7:
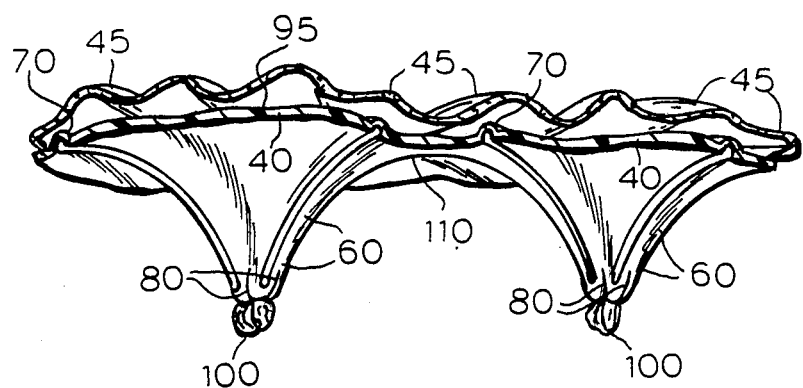
FIG. 7 shows details of the finished product.

The tufted upholstery is then made by the following steps:

1. The thin sheet is formed in the desired shape.
2. The cuts 80 are made in the depressions.
3. The fabric 45 is placed over the top side 95 of the sheet, i.e., the surface having the concave portions 50 and ridges 70 (as shown in FIGS. 5-7).
4. The fabric is affixed to the sheet by pushing a portion of the fabric disposed over each depression 60 with a rod 90 into said depression until a small section of the fabric 100 passes through the cuts 80 made in the sheet and is disposed on the bottom side 110 of said sheet 40. The cuts 80 engage or grip the fabric portion 100 to hold the fabric close to the sheet, and form an attaching means for the fabric integral with said sheet.
5. The assembly formed by the sheet and the fabric is installed on the panel in any conventional manner.

One skilled in the art will appreciate the fact that as portions of the fabric are pushed through the depressions the fabric will conform to the general shape of the top surface 95. Thus the fabric may be formed into any shape desired. The ridges 70 are provided to emphasize the desired decorative pattern of the upholstery. Changing the size and shape of the ridges, or providing other shaped protrusions or impressions in top surface 95 will lead to different patterns for the upholstery.

Furthermore, the simple attaching means provided herein in addition to being inexpensive also allows for easy repairs. Thus, if for any reason the fabric pulls out of the cuts, it can be easily reformed by merely pushing it back with any suitable object such as a pencil.

The rods 90 can be made out of any suitable material. They may be used individually but it would be most efficient if a number of them are pushed against the fabric at the same time by placing them on a common frame.

It is obvious that numerous modifications may be made in the present invention without departing from its scope as defined in the appended claims.

I claim:

1. An upholstery for a panel comprising: a relatively rigid sheet formed into a pattern and having attachment means for attaching fabric thereto, said attaching means being an integral part of said sheet and comprising a plurality of cuts in said sheet, said sheet being formed into concave surfaces separated by depressions, said depressions including said cuts; and a fabric attached to said sheet by said attaching means in a manner to conform to said patterns, portions of said fabric extending through said cuts and being engaged by adjacent surfaces of said sheet defining said cuts when said portions are inserted into and through said cuts whereby the fabric is attached to said sheet by surface interengagement of the portions of the fabric with the adjacent surfaces of cuts of the sheet.

2. The upholstery of claim 1 wherein said sheet also has ridges disposed on said concave surfaces.

3. A method of making tufted upholstery comprising:

forming a thin sheet into a pattern of concave surfaces separated by depressions;

disposing a fabric over one side of said formed sheet, and;

providing a number of cuts in the depressions in said sheet as attaching means for the fabric;

attaching said fabric to said sheet in a manner that the fabric takes the shape of said pattern by pushing portions of said fabric through said cut whereby the fabric is attached to said sheet by surface interengagement of the portions of the fabric with the adjacent surfaces of cuts of the sheet.

4. The method of claim 3 wherein said this sheet is vacuum molded.

5. The method of claim 3 wherein a rod is used to push portions of said fabric through said cuts.

* * * * *